United States Patent
Bryczkowski et al.

(10) Patent No.: US 10,031,711 B2
(45) Date of Patent: Jul. 24, 2018

(54) SYSTEM AND METHOD FOR FACILITATING VIDEO REDUNDANCY

(71) Applicant: Imtech Corporation, Rockaway, NJ (US)

(72) Inventors: Krzysztof Bryczkowski, Bridgewater, NJ (US); Ovidiu V. Dascalu, Metuchen, NJ (US); Matthew A. Ferreira, Bushkill, PA (US)

( * ) Notice: Subject to any disclaimer, the term of this patent is extended or adjusted under 35 U.S.C. 154(b) by 89 days.

(21) Appl. No.: 14/963,631

(22) Filed: Dec. 9, 2015

(65) Prior Publication Data

US 2016/0162247 A1    Jun. 9, 2016

Related U.S. Application Data

(60) Provisional application No. 62/089,571, filed on Dec. 9, 2014.

(51) Int. Cl.
| | |
|---|---|
| *G06F 11/30* | (2006.01) |
| *G06F 3/14* | (2006.01) |
| *G06F 11/16* | (2006.01) |

(52) U.S. Cl.
CPC .......... *G06F 3/1446* (2013.01); *G06F 11/162* (2013.01); *G06F 11/3003* (2013.01); *G09G 2300/026* (2013.01); *G09G 2330/12* (2013.01); *G09G 2370/02* (2013.01)

(58) Field of Classification Search
CPC ............... G06F 11/3006; G06F 11/162; G06F 11/2023; G06F 11/30; G06F 11/3003; G06F 11/3055; G06F 3/1446
See application file for complete search history.

(56) References Cited

U.S. PATENT DOCUMENTS

| | | | | |
|---|---|---|---|---|
| 6,058,420 A | * | 5/2000 | Davies | H04L 43/0805 709/224 |
| 7,596,471 B1 | * | 9/2009 | Beland | G09F 9/30 348/180 |
| 2007/0038939 A1 | * | 2/2007 | Challen | G05B 15/02 715/734 |

* cited by examiner

*Primary Examiner* — Yolanda L Wilson
(74) *Attorney, Agent, or Firm* — Benesch, Friedlander, Coplan & Aronoff LLP

(57) ABSTRACT

A redundant display system includes a communication network, display devices, first and second display nodes, a control node, a monitoring node, and a system node. Display devices each include first and second display inputs. First display nodes include first display outputs, each connected to a first display input to display digital content on display devices and can be assigned the role of main or redundant display node. Second display nodes include second display outputs, each connected to a second display input to display digital content on display devices and can be assigned the role of main or redundant display node. The control node sends digital content to the display nodes. The monitoring node collects operational information of the display nodes and generates alerts if the operational information indicates a failure. The system node receives alerts from the monitoring node and reassigns roles of the display nodes based on the alerts.

20 Claims, 5 Drawing Sheets

SYSTEM AND METHOD FOR FACILITATING VIDEO REDUNDANCY

CROSS-REFERENCE TO RELATED APPLICATIONS

This application claims priority to U.S. Provisional Patent Application Ser. No. 62/089,571, titled "System and Method for Facilitating Video Redundancy," which was filed on Dec. 9, 2014, and which is expressly incorporated by reference herein in its entirety.

FIELD OF INVENTION

The present disclosure relates to the field of data redundancy. More particularly, the present disclosure relates to a system and method for facilitating video redundancy for video arrays arranged as video wall applications.

BACKGROUND

Video monitors are typically arranged in a manner to display information to viewers. In order to display information that is easily accessible to a viewer, it is known to arrange multiple video monitors in an array, where the multiple video monitors are controlled to function as a single monitor. One example of such a video array 100 is illustrated in FIG. 1. The video array 100 of FIG. 1 includes a matrix of twenty individual monitors 110 arranged in five columns and four rows (i.e., a 5×4 matrix). It is noted that the reference number nomenclature used in FIG. 1 identifies the video array as reference number 100 and identifies each individual video monitor using the reference number 110 followed by the row number and column number (e.g. 110-11 for video monitor in row 1, column 1). Such video arrays 100 are also referred to as video wall systems and video wall applications.

Software and hardware can be arranged so that all twenty video monitors 110 display content in a synchronized and coordinated manner so that a single image or video stream is displayed across the video array 100. Such an arrangement can provide for a large pixel space appropriate for displaying high resolution information such as numerical data, maps, satellite photos, television feeds, IP surveillance cameras, applications, webpages, and so on. As will be appreciated, the high resolution of video arrays lends itself applications that display high value and critical images and video content. When an application is arranged to display such high value and critical content, the continuous display of that content can be of the utmost importance. Therefore, any method or system that facilitates the continued display of content on a video array is desirable.

SUMMARY

In one embodiment disclosed herein, a redundant display system includes a communication network, a plurality of display devices, a first display node, a second display node, a control node, a monitoring node, and a system node. The plurality of display devices each includes a first display input and a second display input and is in communication with the communication network. The first display node is in communication with the communication network and includes a plurality of first display outputs, each of which is connected to a first display input. The first display node is arranged to display digital content on the plurality of display devices and can be assigned the role of main display node or redundant display node. The second display node is in communication with the communication network and includes a plurality of second display outputs, each of which is connected to a second display input. The second display node is arranged to display digital content on the plurality of display devices and can be assigned the role of main display node or redundant display node. The control node is in communication with the communication network and configured to send the digital content to the first display node and the second display node. The monitoring node is configured to collect operational information of the first display node and second display node and generate alert information if the operational information indicates failures. The system node is configured to receive alert information from the monitoring node and reassign the role of the first display node and second display node based on the alert information.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

The apparatus, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for facilitating video redundancy are hereinafter disclosed and described in detail with reference made to FIGS. 1-5.

Figure 1:
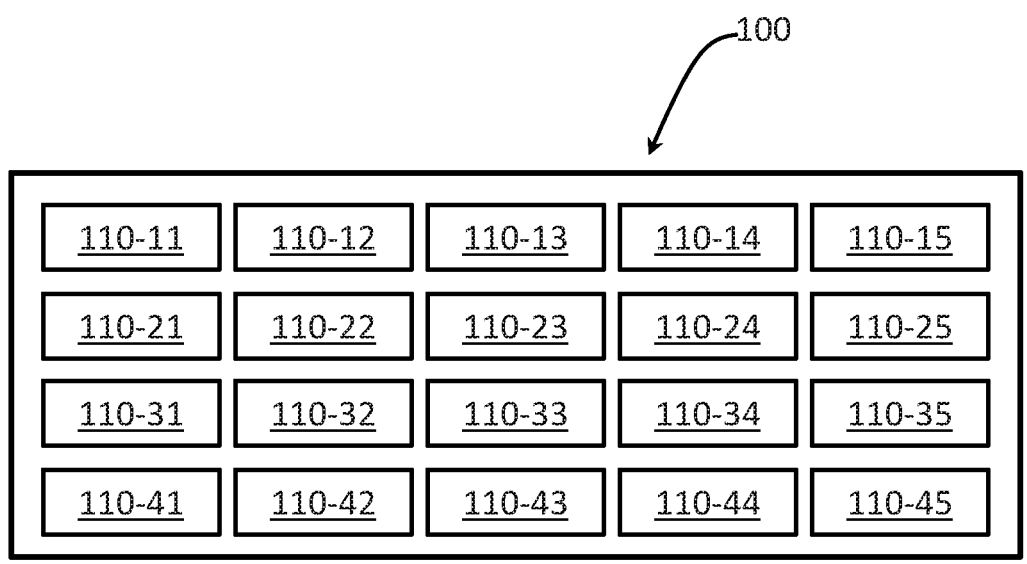
FIG. 1 schematically illustrates an exemplary video array disclosed herein.

As previously discussed, FIG. 1 illustrates an exemplary video array 100 that includes twenty video monitors 110. Such an arrangement of video monitors 110 forms a continuous pixel space with a total number of available pixels that far exceeds what is available with a single display 110. For example in regard to the 5×4 matrix of video monitors 110 illustrated in FIG. 1, if each video monitor 110 has a resolution of 1,920×1,200 pixels, the overall display resolution of the video array 100 is 9,600×4,800, which is in excess of 46 million pixels. Video monitors 110 can be one of commercially available monitors including an not limited to LCD, plasma, LED, OLED, CRT and display cubes based on DLP, LCD, LED and such technologies.

The present disclosure is generally directed to systems and methods for providing consistent and uninterrupted display of images or video content on the video array 100. Because the display of images and video content on the video array 100 relies on hardware and software, failure of hardware and software errors must be considered when designing a system or method for providing consistent and uninterrupted display of images or video content on the video array 100. One method of providing for consistent and uninterrupted display is to build redundancy into the system. This is to say that the system can be arranged so that if a primary display feed fails for any reason, an identical secondary display feed replaces the failed primary display feed. Such a redundant system is illustrated in FIG. 2.

Figure 2:
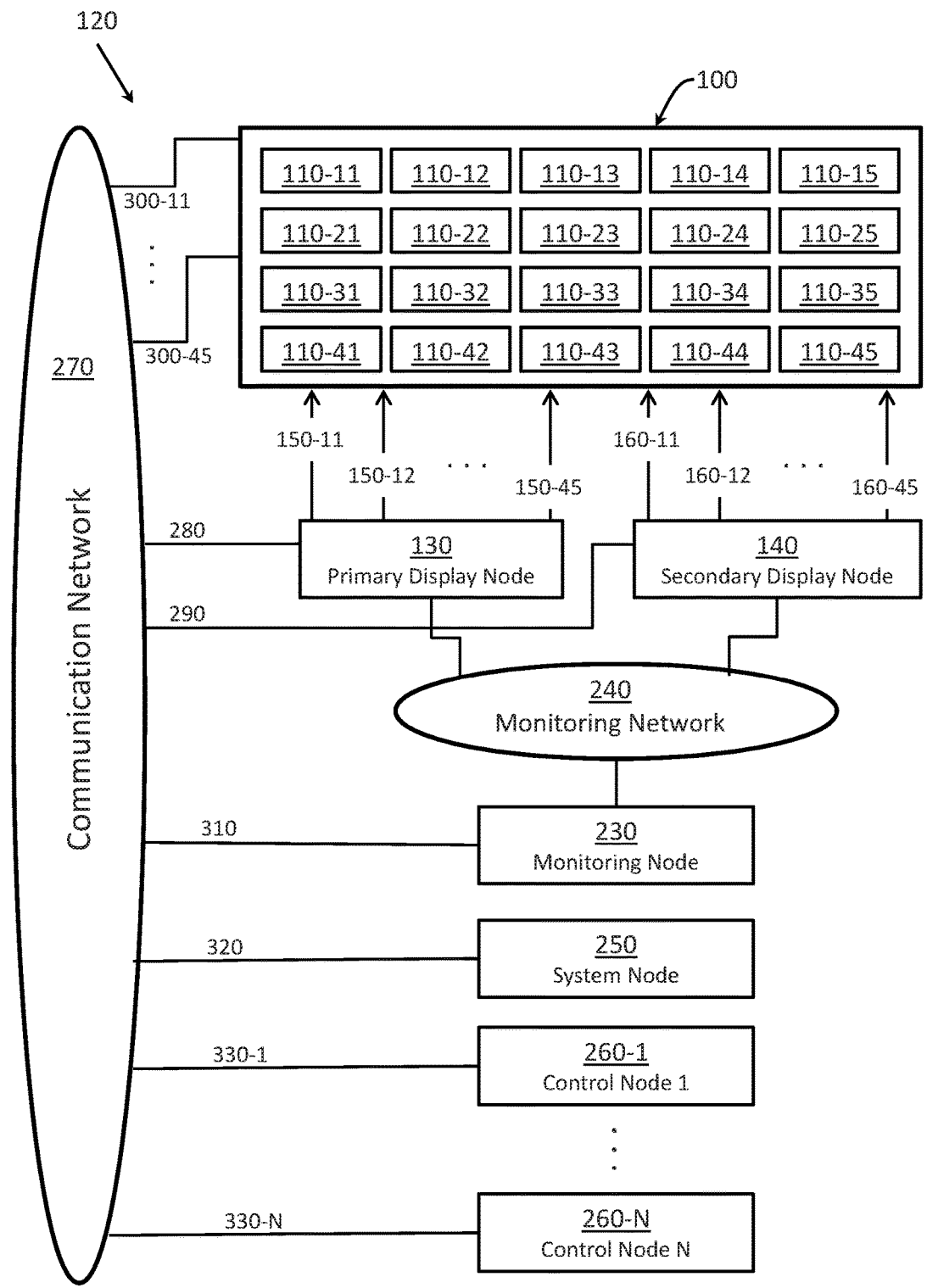
FIG. 2 schematically illustrates a redundant display system as disclosed herein.

FIG. 2 illustrates a redundant display system 120. The redundant display system 120 includes a primary display node 130 and a secondary display node 140. The primary display node 130 can include one or more computer workstation or server connected to one or more of the video monitors 110. As illustrated in FIG. 2, there is a dedicated connection 150 from the primary display node 130 to each individual video monitor 110. Although FIG. 2 illustrates only three dedicated connections (150-11, 150-12, and 150-45), it will be understood that there are twenty dedicated connections 150 from the primary display node 130 to each individual video monitor 110 (e.g., dedicated connection 150-11 connects the primary display node 130 with video monitor 110-11, dedicated connection 150-12 connects the primary display node 130 with video monitor 110-12, and so on).

Similarly, the secondary display node 140 can include one or more computer workstation or server connected to one or more of the video monitors 110. As illustrated in FIG. 2, there is a dedicated connection 160 from the secondary display node 140 to each individual video monitor 110. Although FIG. 2 illustrates only three dedicated connections (160-11, 160-12, and 160-45), it will be understood that there are twenty dedicated connections 160 from the secondary display node 140 to each individual video monitor 110 (e.g., dedicated connection 160-11 connects the secondary display node 140 with video monitor 110-11, dedicated connection 160-12 connects the secondary display node 140 with video monitor 110-12, and so on).

In one example, the video monitors 110 can be rear projection display cubes or thin bezel LCD monitors. Each computer workstation or server of the primary display node 130 and the secondary display node 140 can be configured with one or more multi-graphics cards, depending on the number of available PCI/PCIe slots. Each multi-graphics card can typically have two to eight separate graphics outputs. One or more PCIe expansion chassis can also be attached to the computer workstation or server to accommodate additional multi-graphics cards. Such arrangements can provide for a variety of video arrays, including large arrays, controlled by a single or limited number of computer workstations or servers.

As previously discussed, the large number of pixels accessible in a video array 100 are typically used for displaying a variety of high value and mission critical information, images and video content. Control rooms and command centers are common settings where such high value and critical information, images and video content are displayed so that operators and other decision makers in transportation, public safety, energy, utilities, defense and other organizations or markets can make informed decisions. In such implementations, it can be imperative for mission critical information to be displayed in an uninterrupted manner so that it can be viewed by decision makers.

Since each video array 100 can be controlled by a single or small number of computer workstations or servers, a failure of a single computer workstation or server could drastically disrupt the flow of information being displayed on the video array 100, which can lead to potentially serious operational consequences. Therefore, as disclosed herein, if a computer workstation or server of the primary display node 130 fails, the system can automatically and immediately switch to a synchronous and redundant computer workstation or server of the secondary display node 140. Such a switch can be arranged so that the system maintains complete visual display continuity on the video array 100, thus, avoiding any interruption of information displayed on the video array 100.

Figure 3:
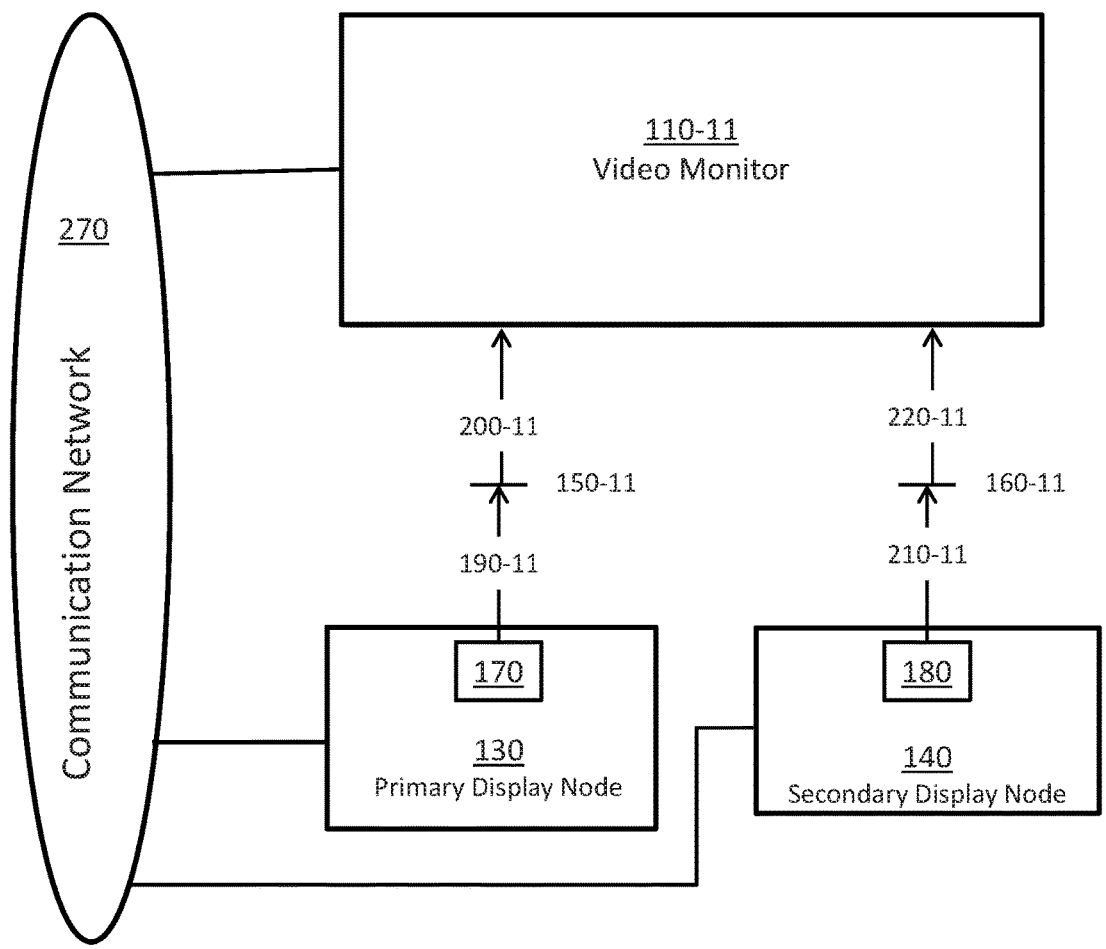
FIG. 3 schematically illustrates components for use with a redundant display system as disclosed herein.

As illustrated in FIG. 3, in one embodiment, the primary display node 130 includes a computing device 170, such as a computer workstation or server, and the secondary display node 140 includes an equivalent computer devices 180, such as a computer workstation or server. A video monitor 110-11 is in direct communication with the computer device 170 of the primary display node 130 via a dedicated connection 150. Likewise, the video monitor 110-11 is in direct communication with the computing device of the secondary display node 140 via another dedicated connection 160. The dedicated connection 150 between the primary server node 130 and the video monitor 110-11 includes two parts, a display output 190-11 from the computing device 170 and a display input 200-11 to the video monitor 110. The dedicated connection 160 between the secondary server node 140 and the video monitor 110-11 includes two parts, a display output 210-11 from the computing device 180 and a display input 220-11 to the video monitor 110-11.

The system is arranged so that at any given time, the content of display output 210-11 from the secondary display node 140 is redundant (i.e., identical) of the content of display output 190-11 from the primary display node 130. Any manipulations of the intended display content is performed prior to sending the display content to both the primary display node 130 and secondary display node 140.

Referring again to FIG. 2, the exemplary redundant system 120 includes a number of additional components. A monitoring node 230 is in communication with both the primary display node 130 and secondary display node 140 via a monitoring network 240. The system 120 further includes a system node 250 and a number of control nodes (generally identified as 260, with specific control nodes identified as 260-1 through 260-N). A communications network 270 provides for passing data and other communications between the various components of the system 120.

Monitoring node 230 is arranged to continuously check the condition of primary display node 130 and secondary display node 140 (i.e., via a "heartbeat" communication). Both the Primary display node 130 and secondary display node 140 provide status regarding its condition to the monitoring node 240. Based on information provided by the primary display node 130 and secondary display node 140, the system node 250 can assign roles to the primary display node 130 and secondary display node 140 based on status determined from the information provided. Examples of roles include "main" display node and "redundant" display node. Examples of status include "UP" (i.e., the display node is operational) and "DOWN" (i.e., the display node is not operational). In order for the system node 250 to assign a role of either "main" or "redundant," the display node must have a status of "UP."

The system 120 can be arranged so that when the primary display node 130 and the secondary display node 140 are running and operational and assigned a status of "UP," the primary display node 130 is assigned the role of "main," and the secondary display node 140 is assigned the role "redundant." The system node 250 can switch the role of any display node from primary (main) to secondary (redundant) and secondary (redundant) to primary (main) based on current state information received from monitoring node 230.

If the monitoring node 230 determines that the display node assigned the role of "main" display node changes status from "UP" to "DOWN," the system node 250 changes the role of the then "redundant" display node the role "main" display node. In conjunction with changing the roles of the display nodes, the system node 250 performs a failover event and distributes the role change information to all control nodes 260. This includes sending a 'switch input' command to all video monitors 110 in the video array 100. The "switch input" command from the system node 250 switches the display inputs to the video monitors 110 from previous "main" display node to the new "main" display node. In one example, if the "main" role is initially assigned to the primary display node 130, and subsequently a failure within the primary display node 130 causes the status of the primary display node 130 to change from "UP" to "DOWN," then the secondary display node 140 will be assigned the role of "main" and the video monitors 110 will switch so that it receives content from the secondary display node 140. The video monitors 110 accomplish this by actively accepting content from the secondary display output 220.

In addition to automating switching of content source, the system 120 can be arranged to provide alerts and other such communications. For example, the monitoring node 230 is arranged to send a message alerting personnel that an error has occurred that has caused the status of a display node to go from "UP" to "DOWN." Such information can be sent in the form of email, SMS, SNMP traps, etc.

When a display node with a status of 'DOWN' is repaired and its status returns to "UP," the monitoring node 230 can assign the repaired display node the role of "redundant." The system node 250 and control nodes 260 can then be informed of the change in role. When a repaired display node is returned to the role of "redundant," typically, no display inputs need to be switched. In the example above, if the primary display node 130 is subject to a failure and subsequently repaired, its role will likely be that of "redundant" and the secondary display node 140 cam keep the role of "main." In other embodiments, the system 120 can be arranged to maintain the role of the primary display node 130 as "main" whenever possible. In such an embodiment, when the primary display node 130 suffers a failure and is repaired, the primary display node 130 is returned to a role of "main." In this case a failover event will be performed and the display monitors 110 will switch inputs so that content is received from the primary display node 130 and not the secondary display node 140.

The system 120 can be arranged so that when the primary display node 130 and secondary display node 140 are both in state "UP" with "main" and "redundant" role assigned, a user of the system 120 can manually switch the roles of the display nodes by instructing the monitoring module 230 to switch roles of the display nodes. Also in this case failover event will be performed in the system node 250 and display inputs will be switched on video monitors 110.

Some embodiments of the systems disclosed herein include multiple pairs of primary and secondary display nodes (see FIG. 4) can exist. Each pair of primary and secondary display nodes is connected to a different array of display devices.

In some embodiments, more than one monitoring node 230 can exist in the video wall system. In this case each of monitoring nodes is dedicated for monitoring different pairs of primary and secondary display nodes and sends status information to one system node 250.

In some embodiments of the systems one primary (main) display node 130 can coexist with multiple secondary (redundant) nodes 140. In this case monitoring node monitors group of primary (main) display node and multiple secondary (redundant) display nodes. In any given moment system node 250 keeps only one display node as 'main' display node based on monitoring failover events. In this scenario displays 100-xy have to support multiple inputs equal to number of display nodes in the monitoring group.

In some embodiments of the systems disclosed herein, monitoring node 230 can monitor presence of display signals on each of video monitors 110 in video array 100. Lack of display signal on one of the display inputs can be reported to the system node 250. In addition, alert information can be sent by the monitoring node 230 in form of email, SMS, SNMP traps, etc. Lack of a display signal on display inputs in conjunctions with "UP" state of display node can indicate problems with video cable connecting display node outputs and display inputs. In this case system node 250 can switch display input to activate one in order to keep graphical content visible on the display.

The control nodes 260 provide for users of the system 120 to adjust or modify how content is displayed on the video array 100. For example, control nodes 260 can be Graphical User Interface (GUI) that provide a user with the capability to manually or programmatically orchestrate content on the video array 100 by adding, resizing, zooming, moving, transparency control, deleting and changing information for multiple source windows. Examples of such GUIs are keyboard, mouse, touch screen, and the like. The user can interact with the video array 100 in real-time or near real-time. The system node 250 can be arranged to provide users of the system 120 with the capability to define, deliver and manage content displayed on the video array 100. The system node can be arranged to define the resources for the video array 100 such as the video array configuration, device definitions, source definition, user access and data flaw control.

As illustrated in the figures, the communications network 270 facilitates communication between various components and modules of the system 120. For example, communication link 280 provides for the video content to be delivered to the primary display node 130, and communication link 290 provides for video content to be delivered to the secondary display node 140. In one embodiment, video content can be delivered to the primary display node 130, which then forwards the content on to secondary display node 140. Such an embodiment can facilitate consistency between the video content of the primary display node 130 and video content of the secondary display node 140.

Communication link 310 facilitates communication between the monitoring node 230, the communications network 270, to other components of the system. Communication link 320 facilitates communication between the system node 250, the communications network 270, to other components of the system. Communication links 330 facilitate communication between the control nodes 260, the communications network 270, to other components of the system.

Communication links 300 can connect the communications network 270 with each video monitor 110. For example, as illustrated in FIG. 2, communications link 300-11 can connect the communications network 270 with video monitor 110-11, and communications link 300-45 can connect the communications network 270 with video monitor 110-45. These communication links can be used to separately monitor and control each video monitor 110.

Figure 4:
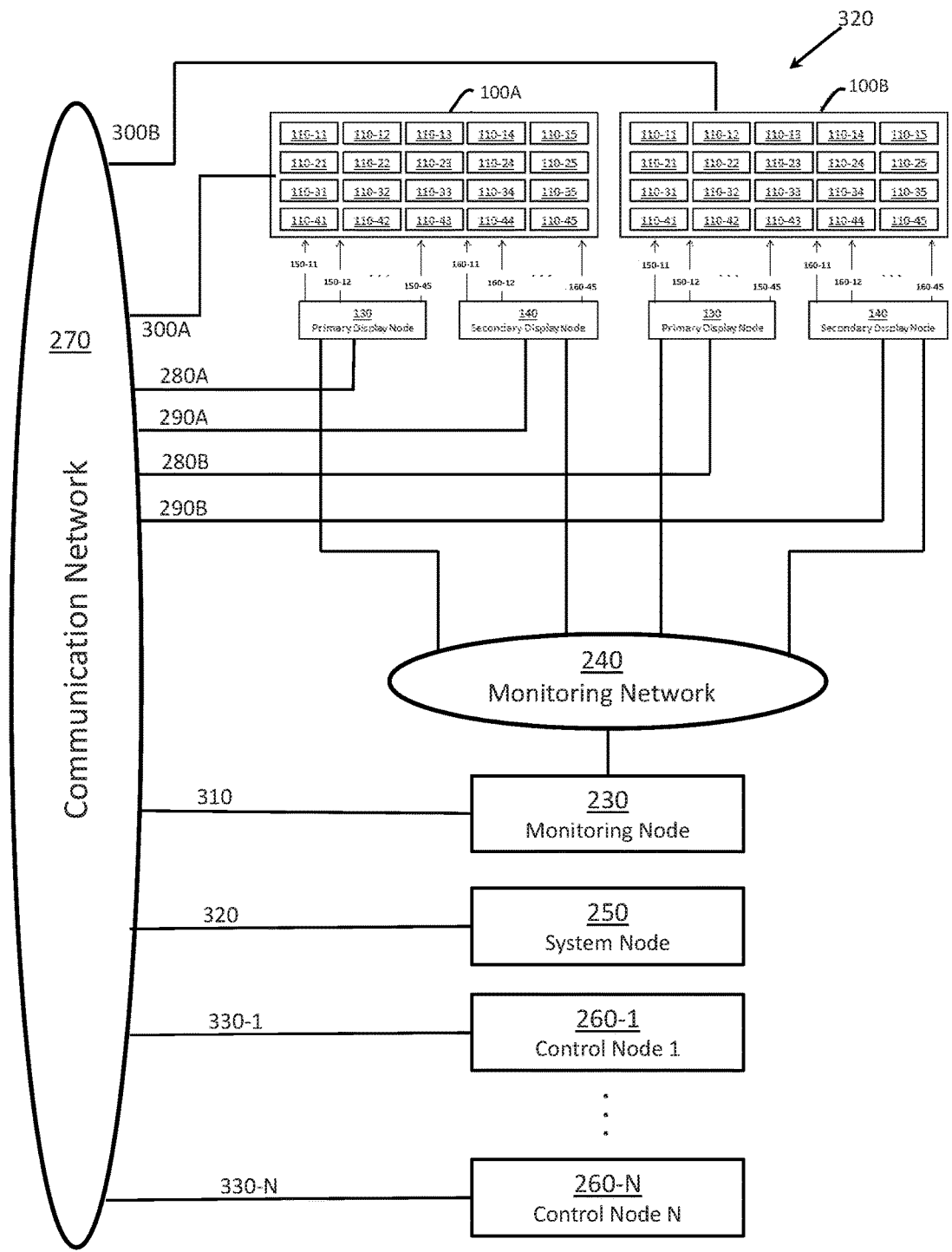
FIG. 4 schematically illustrates another redundant display system as disclosed herein.

Systems and methods as disclosed herein can include multiple pairs of primary and secondary display nodes, as illustrated in FIG. 4. The system 320 illustrated in FIG. 4 includes two video arrays 100A and 100B. Each video array includes its own primary display node and secondary display node, which are in communication with all video monitor 110 as described herein. Communication links 300A and 300B can connect the communications network 270 with each video monitor 110 in video displays 100A and 100B. The system 320 illustrated in FIG. 4 includes the monitoring node 230 that monitors all primary display nodes 130 and secondary display nodes 140 of the system 320. However, in some embodiments, the system can include more than one monitoring node 230. For example, the system can include one monitoring node for each pair of primary and secondary display nodes, where each monitoring node is dedicated to monitoring a single pair of primary and secondary display nodes. In such an embodiment, the system can include a dedicated system node 250, which communicates with one of the multiple monitoring nodes.

In some embodiments the system includes more than two display nodes, where one display node is assigned the role of "MAIN" (i.e., the primary display node), and multiple display nodes are assigned the role of "REDUNDANT" (i.e., secondary display nodes). In such an embodiment the monitoring node monitors a group of one primary (MAIN) display node and multiple secondary (REDUNDANT) display nodes. In any given instant, the system node can keep only one display node as "MAIN" display node based on monitoring failover events and keeps multiple display nodes as "REDUNDANT" display nodes. In such a scenario, each video monitor 110 supports multiple inputs equal to number of display nodes in the monitoring group.

Figure 5:
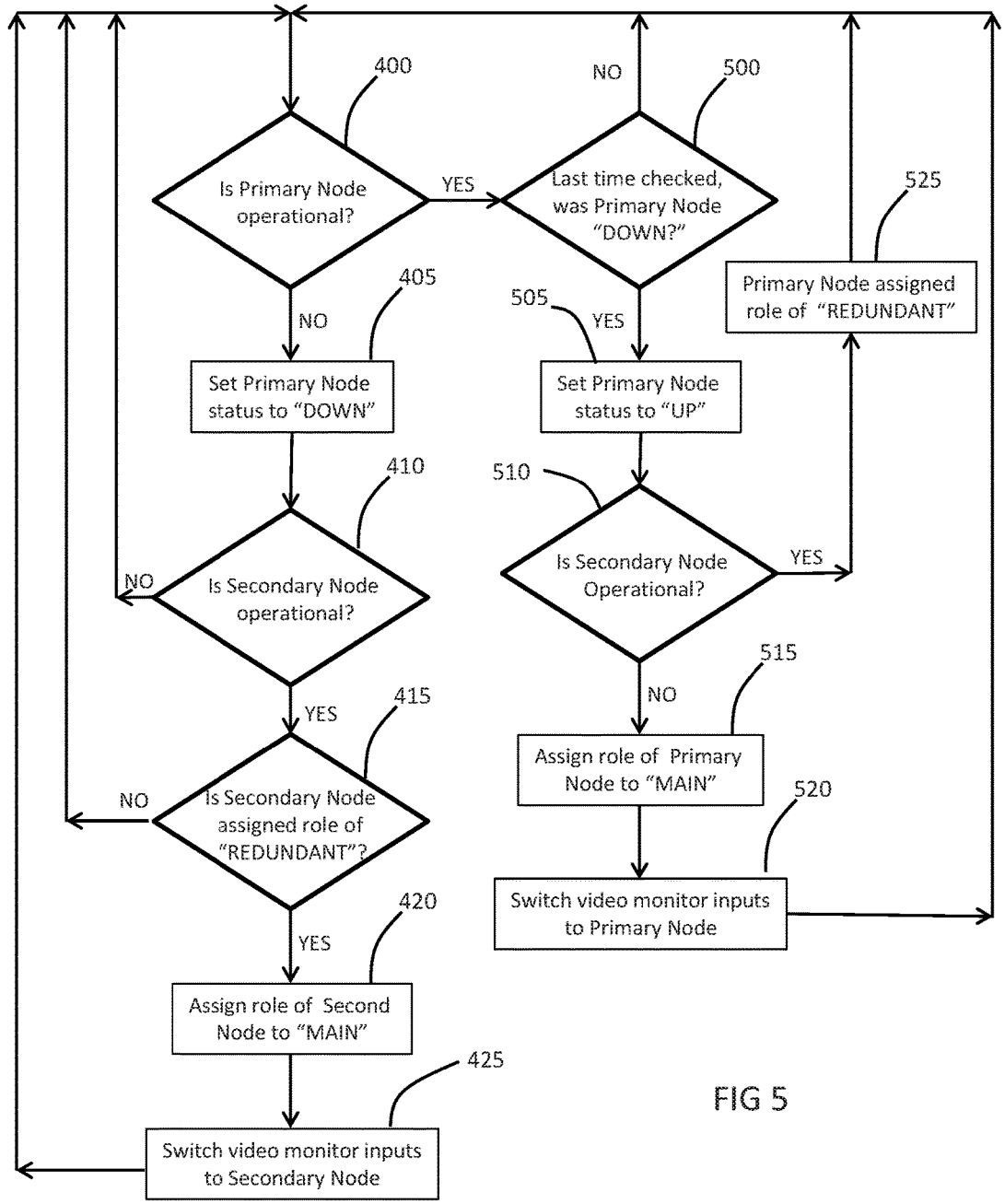
FIG. 5 is a flowchart illustrating a method for providing redundant display functionality as disclosed herein.

FIG. 5 illustrates a flow chart of a method or process for monitoring the primary display node and switching a secondary display node to the primary display node when the primary display node has failed. As previously described, a secondary display node is switched to the primary display node by assigning the display node's role to "MAIN." For the purposes of describing the flow chart of FIG. 5, the term "primary display node" is used to describe the display node that is initially assigned the role of "MAIN," and the term "secondary display node" is used to describe the display node that is initially assigned the role of "REDUNDANT."

The monitoring process starts at process block 400, where the monitoring node inspects the primary display node to determine if the primary display node is operational. If the primary display node is operational, the process proceeds to process block 500. At process block 500, the last previously recorded status for the primary display node is checked to determine if the last previously recorded status was "UP" or "DOWN." If the last previously recorded status was "UP," the process returns to process block 400. The process as described in this paragraph, (i.e., proceeding from process block 400 to process block 500 and back to process block 400) occurs repeatedly when there are no failures in the system and the equipment of the system is working as expected.

At process block 400, if the primary display node is not operational, the process proceeds to process block 405. At process block 405, the status of the primary display node is set to "DOWN" because it has already been determined that the primary display node is no longer operational. The process then proceeds to process block 410, where the monitoring node inspects the secondary display node to determine if the secondary display node is operational. If the secondary display node is not operational, the process returns to process block 400. If the secondary display node is operational, the process proceeds to process block 415, where it is determined if the secondary display node is assigned the role of "REDUNDANT." If the secondary display node is not assigned the role of "REDUNDANT," the process returns to process block 400. If the secondary display node is assigned the role of "REDUNDANT," the process proceeds to process block 420, where the secondary node is assigned the role of "MAIN." The process proceeds to process block 425, where the system node switches the display inputs to all video monitors 110 from the primary display node to the secondary display node. The process then returns to process block 400.

Returning to process block 500, if the last previously recorded status of the primary display node was "DOWN," it is determined that a previously inoperable primary display node is now operational once again, and the process proceeds to process block 505. At process block 505 the status of the primary display node status is set to "UP" to reflect that the primary display node is now operational. The process then proceeds to process block 510, where it is determined whether the secondary display node is operational. If the secondary display node is operational, the process proceeds to process block 525, where the primary display node is assigned the role of "REDUNDANT." The process then returns to process block 400. If the secondary display node is not operational, the process proceeds to process block 515. At process block 515, the primary display node is assigned the role of "MAIN." The process then proceeds to process block 520, where the system node switches the display inputs to all video monitors 110 from the secondary display node to the primary display node. The process then returns to process block 400.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed:

1. A redundant display system comprising:
   a communication network;
   a plurality of display devices in communication with the communication network, each display device including a first display input and a second display input;
   a first display node in communication with the communication network and arranged to display digital content on the plurality of display devices, the first display node including a plurality of first display outputs, each of which is connected to the first display input of one of the plurality of display devices, where the first display node can be assigned the role of main display node or redundant display node;

a second display node in communication with the communication network and arranged to display digital content on the plurality of display devices, the second display node including a plurality of second display outputs, each of which is connected to the second display input of one of the plurality of display devices, where the second display node can be assigned the role of main display node or redundant display node;

a control node in communication with the communication network and configured to send the digital content to the first display node and the second display node;

a monitoring node configured to collect operational information of the first display node and second display node and generate alert information if the operational information indicates the first display node or second display node has failed; and a system node configured to receive alert information from the monitoring node and reassign the role of the first display node and second display node based on the alert information.

2. The system of claim 1, where in the digital content includes digital images and states.

3. The system of claim 2, where states includes information on location, size, and visual attributes.

4. The system of claim 3, wherein the control node is configured to send images of the digital content to both the first and second display nodes and sends the states to the display node assigned to the role of main display node, where the main display node sends states to the display node assigned to the role of redundant display node.

5. The system of claim 3, wherein digital images on the first display node and second display node are maintained as identical through use of the states.

6. The system of claim 1, wherein the monitoring node is arranged to send alerts to receivers in communication with the communication network.

7. The system of claim 6, wherein the receivers are sent alerts via an electronic mail, a short message service, a simple network management protocol (SNMP), or SNMP Trap.

8. The system of claim 1 further including a monitoring network, wherein the monitoring node communicates with the first and second display nodes via the monitoring network.

9. The system of claim 8, wherein the monitoring node communicates with the system node via the communication network.

10. The system of claim 1, wherein the monitoring node communicates with the first display node, the second display node, and the system node via the communication network.

11. The system of claim 1, wherein the system node can switch the role assigned to the first display node or the second display node between main display node and redundant display node.

12. The system of claim 11, wherein the system node can switch the role assigned to the first display node and second display node based on operational information about the first display node and second display node received from monitoring node.

13. The system of claim 1, wherein the system includes more than one monitoring node; and more than one control node.

14. The system of claim 13, wherein the digital content from the first display node and second display nodes is synchronized by the more than one control node.

15. The system of claim 1 including more than two display nodes, wherein one display node is assigned the role of main display node and the remaining display nodes are assigned the role of redundant display node.

16. The system of claim 1 including more than three display nodes and a plurality of arrays of display devices, wherein two or more display nodes are assigned the role of main display node and two or more display nodes are assigned the role of redundant display node.

17. The system of claim 16, wherein one display node assigned the role of main display node is paired with one display node assigned the role of redundant display node, and each pair of display nodes is connected to a separate array of display devices.

18. The system of claim 17, wherein two or more of the plurality of arrays of display devices are configured to create together a continuous display area where each pair of display nodes the array of display devices the pair of display nodes are connected to display a portion of an overall digital image.

19. The system of claim 17, wherein each array of display devices can be configured with the same rectangular size.

20. The system of claim 17, wherein each array of display devices can be configured with a different size and different shape.

* * * * *